US010633519B2

(12) United States Patent
Spyrou et al.

(10) Patent No.: US 10,633,519 B2
(45) Date of Patent: Apr. 28, 2020

(54) STORAGE-STABLE POLYURETHANE PREPREGS AND MOULDINGS PRODUCED THEREFROM COMPOSED OF A POLYURETHANE COMPOSITION WITH LIQUID RESIN COMPONENTS

(75) Inventors: Emmanouil Spyrou, Schermbeck (DE); Friedrich Georg Schmidt, Haltern am See (DE); Eike Langkabel, Wegberg (DE); Katharina Cielaszyk, Marl (DE); Sandra Reemers, Münster (DE); Holger Loesch, Herne (DE); Elke Gollan, Herne (DE); Marina Grammenos, Düsseldorf (DE)

(73) Assignee: Evonik Operations GmbH, Essen (DE)

(*) Notice: Subject to any disclaimer, the term of this patent is extended or adjusted under 35 U.S.C. 154(b) by 75 days.

(21) Appl. No.: 14/007,585

(22) PCT Filed: Mar. 21, 2012

(86) PCT No.: PCT/EP2012/054938
§ 371 (c)(1),
(2), (4) Date: Dec. 5, 2013

(87) PCT Pub. No.: WO2012/130672
PCT Pub. Date: Oct. 4, 2012

(65) Prior Publication Data
US 2014/0087613 A1 Mar. 27, 2014

(30) Foreign Application Priority Data
Mar. 25, 2011 (DE) .................. 10 2011 006 163

(51) Int. Cl.
C08K 7/14 (2006.01)
C08G 18/42 (2006.01)
C08J 5/24 (2006.01)
C08G 18/79 (2006.01)
C08G 18/48 (2006.01)
C08G 18/32 (2006.01)
C08K 5/315 (2006.01)
B29B 15/10 (2006.01)

(52) U.S. Cl.
CPC ............ C08K 7/14 (2013.01); C08G 18/3206 (2013.01); C08G 18/42 (2013.01); C08G 18/48 (2013.01); C08G 18/798 (2013.01); C08J 5/24 (2013.01); C08K 5/315 (2013.01); B29B 15/10 (2013.01); C08J 2375/04 (2013.01); C08J 2375/08 (2013.01); Y10T 442/20 (2015.04)

(58) Field of Classification Search
CPC ......... C08K 7/14; C08G 18/00; C08G 18/06; C08G 18/097; C08G 18/80; C08G 18/16; C08G 18/28; C08G 18/4825; B32B 15/095; D06N 3/14; D06N 3/147; C08C 18/707
USPC ....... 428/221, 320.2, 297.4; 442/59, 63, 149
See application file for complete search history.

(56) References Cited

U.S. PATENT DOCUMENTS

| 3,936,575 | A | | 2/1976 | Watanabe et al. | |
|---|---|---|---|---|---|
| 4,246,380 | A | * | 1/1981 | Gras et al. | 525/440.02 |
| 4,400,497 | A | * | 8/1983 | Blum | C08G 18/08 427/388.1 |
| 4,442,280 | A | * | 4/1984 | Grogler | C08G 18/707 252/182.2 |
| 4,581,432 | A | * | 4/1986 | Blum | C08G 18/6505 252/183.12 |
| 5,185,442 | A | * | 2/1993 | Weber | C07D 495/04 540/555 |
| 5,308,679 | A | | 5/1994 | Saito et al. | |
| 5,439,863 | A | | 8/1995 | Bottcher et al. | |
| 5,716,676 | A | * | 2/1998 | Schutze et al. | 427/385.5 |
| 6,468,643 | B1 | | 10/2002 | Kanbayashi et al. | |
| 6,495,650 | B2 | | 12/2002 | Kohlstruk et al. | |
| 6,703,471 | B2 | | 3/2004 | Kohlstruk et al. | |
| 6,747,070 | B2 | | 6/2004 | Wenning et al. | |
| 6,825,240 | B2 | | 11/2004 | Wenning et al. | |

(Continued)

FOREIGN PATENT DOCUMENTS

| CN | 101293950 A | 10/2008 |
|---|---|---|
| CN | 102361902 A | 2/2012 |

(Continued)

OTHER PUBLICATIONS

Products and Properties Desmodur® / Desmophen® for Caotings. Bayer material Science. Ed. Feb. 16, 2004.*

(Continued)

Primary Examiner — Jennifer A Gillett
(74) Attorney, Agent, or Firm — Oblon, McClelland, Maier & Neustadt, L.L.P.

(57) ABSTRACT

Provided is a storage-stable polyurethane prepegs and mouldings produced therefrom composed of polyurethane compositions with liquid resin components, preferably liquid polyols. A prepeg contains (A) a fibrous support and (B) a matrix material containing a reactive polyurethane composition. The polyurethane composition contains a mixture of a liquid resin component (b) having a functional group reactive towards an isocyanate and having a glass transition temperature (Tg) or melting point below 25° C., with a hydroxyl number of 50 to 2000 mg KOH/gram, and a curing agent (a) comprising a di- or polyisocyanate internally blocked or blocked with a blocking agent. In addition, the polyurethane composition contains 0.6 to NCO equivalents or 0.3 to 1 uretdione group in (a) for each functional group of (b).

25 Claims, No Drawings

(56) References Cited

U.S. PATENT DOCUMENTS

| | | | |
|---|---|---|---|
| 6,861,465 B2 | 3/2005 | Wenning et al. | |
| 6,914,115 B2 | 7/2005 | Spyrou et al. | |
| 6,924,385 B2 | 8/2005 | Lettmann et al. | |
| 6,960,620 B2 | 11/2005 | Wenning et al. | |
| 7,307,135 B2 | 12/2007 | Spyrou | |
| 8,222,312 B2 | 7/2012 | Spyrou et al. | |
| 8,455,090 B2 | 6/2013 | Schmidt et al. | |
| 8,476,376 B2 | 7/2013 | Grenda et al. | |
| 8,524,837 B2 | 9/2013 | Grenda et al. | |
| 8,569,440 B2 | 10/2013 | Spyrou et al. | |
| 8,674,050 B2 | 3/2014 | Spyrou | |
| 8,702,899 B2 | 4/2014 | Spyrou et al. | |
| 8,829,146 B2 | 9/2014 | Spyrou | |
| 2004/0048968 A1* | 3/2004 | Mikolajetz | 524/457 |
| 2004/0077801 A1 | 4/2004 | Feola et al. | |
| 2004/0110918 A1* | 6/2004 | Laas | C08G 18/0895 528/73 |
| 2005/0236730 A1* | 10/2005 | Joshi | C08G 18/0885 264/137 |
| 2005/0239357 A1* | 10/2005 | Wesch | B32B 5/26 442/59 |
| 2005/0239956 A1 | 10/2005 | Spyrou et al. | |
| 2005/0239992 A1 | 10/2005 | Spyrou et al. | |
| 2006/0052573 A1* | 3/2006 | Facke | C09D 175/16 528/44 |
| 2007/0178793 A1* | 8/2007 | Gerello | 442/394 |
| 2007/0266897 A1 | 11/2007 | Spyrou | |
| 2007/0282089 A1 | 12/2007 | Spyrou | |
| 2008/0139753 A1 | 6/2008 | Spyrou et al. | |
| 2008/0171816 A1 | 7/2008 | Spyrou et al. | |
| 2008/0214728 A1 | 7/2008 | Spyrou et al. | |
| 2008/0265201 A1* | 10/2008 | Spyrou et al. | 252/8.57 |
| 2008/0269415 A1 | 10/2008 | Spyrou et al. | |
| 2009/0018262 A1* | 1/2009 | Licht et al. | 524/591 |
| 2009/0155603 A1* | 6/2009 | Zheng et al. | 428/425.6 |
| 2010/0124649 A1* | 5/2010 | Rukavina | B32B 27/40 428/292.1 |
| 2010/0179273 A1 | 7/2010 | Spyrou et al. | |
| 2010/0179282 A1 | 7/2010 | Spyrou | |
| 2010/0227942 A1 | 9/2010 | Spyrou et al. | |
| 2010/0249310 A1* | 9/2010 | Spyrou | 524/500 |
| 2011/0039030 A1* | 2/2011 | Spyrou | 427/389 |
| 2012/0003890 A1* | 1/2012 | Schmidt et al. | 442/1 |
| 2012/0003891 A1 | 1/2012 | Schmidt et al. | |
| 2012/0071577 A1 | 3/2012 | Pfeffer et al. | |
| 2012/0073472 A1 | 3/2012 | Spyrou et al. | |
| 2012/0077932 A1 | 3/2012 | Pfeffer et al. | |
| 2013/0041102 A1 | 2/2013 | Albrecht et al. | |
| 2013/0041103 A1 | 2/2013 | Grenda et al. | |
| 2013/0045652 A1 | 2/2013 | Schmidt et al. | |
| 2013/0078417 A1 | 3/2013 | Schmidt | |
| 2013/0230716 A1 | 9/2013 | Schmidt et al. | |
| 2013/0231022 A1 | 9/2013 | Schmidt et al. | |
| 2014/0065911 A1 | 3/2014 | Schmidt et al. | |
| 2014/0316056 A1 | 10/2014 | Grenda et al. | |

FOREIGN PATENT DOCUMENTS

| | | |
|---|---|---|
| CN | 102361917 A | 2/2012 |
| DE | 2 164 381 | 6/1973 |
| DE | 2 407 923 A1 | 9/1974 |
| DE | 24 30 426 A1 | 1/1975 |
| DE | 30 00 940 A1 | 7/1980 |
| DE | 31 48 358 A1 | 9/1982 |
| EP | 0 111 122 | 6/1984 |
| EP | 0 578 974 A2 | 1/1994 |
| EP | 0 589 167 | 3/1994 |
| EP | 0 669 353 A1 | 8/1995 |
| EP | 1 097 804 A1 | 5/2001 |
| EP | 1 413 612 A1 | 4/2004 |
| EP | 1 081 180 B1 | 5/2006 |
| FR | 2 544 322 A1 | 10/1984 |
| GB | 1411958 | 10/1975 |
| GB | 2 093 035 | 8/1982 |
| JP | 6-2277 A | 1/1994 |
| JP | 11-060677 A | 3/1999 |
| JP | 2001-98084 A | 4/2001 |
| JP | 2004-506800 A | 3/2004 |
| JP | 2009-126917 A | 6/2009 |
| JP | 2010-6900 A | 1/2010 |
| WO | WO 02/16482 A2 | 2/2002 |
| WO | WO 2007/064688 A2 | 6/2007 |
| WO | WO 2007/064688 A3 | 6/2007 |
| WO | WO 2010/108701 A1 | 9/2010 |
| WO | WO 2010/108723 A1 | 9/2010 |
| WO | WO 2011/147688 A1 | 12/2011 |
| WO | WO 2011/157507 A1 | 12/2011 |
| WO | WO 2012/038105 A1 | 3/2012 |
| WO | WO 2012/038200 A1 | 3/2012 |
| WO | WO 2012/038201 A1 | 3/2012 |
| WO | WO 2012/038203 A1 | 3/2012 |
| WO | WO 2012/093006 A1 | 7/2012 |

OTHER PUBLICATIONS

Ethanolamine. Wikipedia. http://en.wikipedia.org/wiki/Ethanolamine. Captured May 23, 2010.*
Perstop Winning Formulas. Product Catalog. Copyrgiht Feb. 2011.*
Knoevel. Trethylene Glycol. ChemTech Publishing. Plasticizer Database (2nd Electronic Edition). 2004.*
Polyol R2490. Product Datasheet. Perstorp. Approved Jan. 10, 2014.*
Combined Office Action and Search Report dated Oct. 30, 2013 in Chinese Patent Application No. 201180026242.2 (English translation only).
International Search Report dated Sep. 13, 2011 in PCT/EP11/57658 Filed May 12, 2011.
International Search Report dated Sep. 5, 2011 in PCT/EP11/58805 Filed May 30, 2011.
International Search Report dated Dec. 23, 2011 in PCT/EP11/64895 Filed Aug. 30, 2011.
International Search Report dated Dec. 19, 2011 in PCT/EP11/64942 Filed Aug. 31, 2011.
International Search Report dated Dec. 19, 2011 in PCT/EP11/64905 Filed Aug. 30, 2011.
Li Shaoxiong, et al., Polyurethane Adhesives, 1st edition, Chemical Industry Press, Aug. 31, 1998, pp. 207-208 (with partial English translation).
U.S. Appl. No. 13/256,394, filed Sep. 13, 2011, US2012/0003891 A1, Schmidt, et al.
U.S. Appl. No. 13/695,652, filed Nov. 1, 2012, US2013/0045652 A1, Schmidt, et al.
U.S. Appl. No. 13/700,734, filed Nov. 29, 2012, US2013/0078417 A1, Schmidt.
U.S. Appl. No. 13/825,728, filed Mar. 22, 2013, Schmidt, et al.
U.S. Appl. No. 13/824,084, filed May 20, 2013, US2013/0231022 A1, Schmidt, et al.
U.S. Appl. No. 13/824,035, filed May 22, 2013, US2013/0230716 A1, Schmidt, et al.
U.S. Appl. No. 13/824,064, filed May 9, 2013, US2013/0231017 A1, Schmidt, et al.
U.S. Appl. No. 13/978,059, filed Aug. 21, 2013, Schmitt, et al.
International Search Report dated Jun. 11, 2012 in PCT/EP2012/054938.
U.S. Appl. No. 14/774,395, filed Sep. 10, 2015, Spyrou, et al.
U.S. Appl. No. 14/705,485, filed May 6, 2015, Stapperfenne, et al.
U.S. Appl. No. 14/705,563, filed May 6, 2015, Stapperfenne, et al.
U.S. Appl. No. 10/591,815, filed Jul. 24, 2007, US2007/0266897 A1, Spyrou.
U.S. Appl. No. 10/591,814, filed May 24, 2007, US2007/0282089 A1, Spyrou.
U.S. Appl. No. 11/115,163, filed Apr. 27, 2005, US2005/0239956 A1, Spyrou et al.
U.S. Appl. No. 11/115,354, filed Apr. 27, 2005, US2005/0239992 A1, Spyrou et al.
U.S. Appl. No. 11/576,703, filed Aug. 23, 2007, US2008/0269415 A1, Spyrou et al.

(56) References Cited

OTHER PUBLICATIONS

U.S. Appl. No. 11/722,740, filed Oct. 22, 2007, US2008/0139753 A1, Spyrou et al.
U.S. Appl. No. 11/909,098, filed Sep. 19, 2007, US2008/0171816 A1, Spyrou et al.
U.S. Appl. No. 12/090,255, filed Jul. 3, 2008, US2010/0179273 A1, Spyrou et al.
U.S. Appl. No. 12/088,949, filed Apr. 2, 2008, US2008/0214728 A1, Spyrou et al.
U.S. Appl. No. 12/601,835, filed Nov. 25, 2006, US2010/0179282 A1, Spyrou.
U.S. Appl. No. 11/744,053, filed May 3, 2007, US2008/0265201 A1, Spyrou et al.
U.S. Appl. No. 12/682,993, filed Apr. 14, 2010, US2010/0227942 A1, Spyrou et al.
U.S. Appl. No. 13/376,757, filed Dec. 7, 2011, US2012/0077932 A1, Pfeffer et al.
U.S. Appl. No. 13/375,664, filed Dec. 1, 2011, US2012/0071577 A1, Pfeffer et al.
U.S. Appl. No. 13/376,780, filed Dec. 7, 2011, US2012/0073472 A1, Spyrou et al.
U.S. Appl. No. 13/903,251, filed May 28, 2013, US2014/0316056 A1, Grenda et al.
U.S. Appl. No. 13/583,252, filed Sep. 10, 2012, US2013/0041103 A1, Grenda et al.
U.S. Appl. No. 13/642,762, filed Oct. 22, 2012, US2013/0041102 A1, Albrecht et al.
U.S. Appl. No. 14/433,186, filed Apr. 2, 2015, Spyrou et al.
U.S. Appl. No. 14/431,085, filed Mar. 25, 2015, Spyrou et al.
U.S. Appl. No. 13/973,425, filed Aug. 22, 2013, US2014/0065911 A1, Schmidt, et al.
U.S. Appl. No. 14/685,162, filed Apr. 13, 2015, Spyrou, et al.
Office Action dated Nov. 9, 2018 in indian Patent Application No. 7349/CHENP/2013 filed Sep. 12, 2013 (NOTE: This is an electronically generated report.).

* cited by examiner

STORAGE-STABLE POLYURETHANE PREPREGS AND MOULDINGS PRODUCED THEREFROM COMPOSED OF A POLYURETHANE COMPOSITION WITH LIQUID RESIN COMPONENTS

CROSS REFERENCE TO RELATED APPLICATIONS

The present application is a 35 U.S.C. § 371 national stage patent application of International patent application PCT/EP2012/054938, filed on Mar. 21, 2012, published as WO/2012/130672 on Oct. 4, 2012, the text of which is incorporated by reference, and claims the benefit of the filing date of German application no. 102011006163.0, filed on Mar. 25, 2011, the text of which is also incorporated by reference.

The invention relates to storage-stable polyurethane prepregs and mouldings produced therefrom composed of polyurethane compositions with liquid resin components, preferably liquid polyols.

The polyurethane compositions with liquid resin components, preferably liquid polyols, are particularly suitable for the production of storage-stable polyurethane prepregs and for mouldings produced therefrom (composite components). The storage-stable polyurethane prepregs are obtainable by a process using impregnation in the form of fabrics and non-wovens by using the said reactive polyurethane compositions.

Various moulding processes, such as for example the reaction transfer moulding (RTM) process, comprise the introduction of the reinforcing fibres into a mould, the closing of the mould, the introduction of the crosslinkable resin formulation into the mould and the subsequent crosslinking of the resin, typically by application of heat.

One of the limitations of such a process is relative difficulty of laying the reinforcing fibres in the mould. The individual layers of the fabric or non-woven must be cut to size and adapted to a great variety of mould geometries. This can be both time-intensive and also complicated, in particular when the moulding is also intended to contain foam or other cores. Mouldable fibre reinforcements with simple handling and pre-existing reshaping possibilities would be desirable here.

Fibre reinforced materials in the form of prepregs are already used in many industrial applications because of their ease of handling and the increased efficiency during processing in comparison to the alternative wet lay-up technology.

Industrial users of such systems, as well as faster cycle times and higher storage stabilities even at room temperature, also demand the possibility of cutting the prepregs to size, without the cutting tools becoming contaminated with the often sticky matrix material during automated cutting to size and lay-up of the individual prepreg layers.

As well as polyesters, vinyl esters and epoxy systems, there are a range of specialized resins in the field of the crosslinking matrix systems. These also include polyurethane resins, which because of their toughness, damage tolerance and strength are used in particular for the production of composite profiles by pultrusion processes. The toxicity of the isocyanates used is often mentioned as a disadvantage.

Polyurethane composites also exhibit superior toughness compared to vinyl esters, unsaturated polyester resins (UPR) or UPR-urethane hybrid resins.

Prepregs and composites produced therefrom on the basis of epoxy systems are for example described in WO 98/50211, U.S. Pat. Nos. 4,992,228, 5,080,857, 5,427,725, GB 2007676, GB 2182074, EP 309 221, EP 297 674, WO 89/04335, U.S. Pat. Nos. 5,532,296 and 4,377,657, 4,757,120.

In WO 2006/043019, a process for the production of prepregs on the basis of epoxy resin polyurethane powders is described.

Furthermore, prepregs based on thermoplastics in powder form as the matrix are known.

In US 2004/0231598, a method is described wherein the particles are passed through a special acceleration chamber with electrostatic charging. This device is used for the coating of glass, aramid or carbon fibre substrates for the production of prepregs from thermoplastic resins. As resins, polyethylene (PE), polypropylene (PP), polyether ether ketone (PEEK), polyether sulphone (PES), polyphenyl sulphone (PPS), polyimide (PI), polyamide (PA), polycarbonate (PC), polyethylene terephthalate (PET), polyurethane (PU), polyester and fluoro polymers are mentioned. The thermoplastic prepreg textiles produced therefrom exhibit inherent toughness, good viscoelastic damping behaviour, unlimited storage life, and good chemicals resistance and recyclability.

In WO 98/31535, a method for powder impregnation is described, wherein the glass or carbon fibre strands to be impregnated are impacted with a particle/liquid or particle/gas mixture in a defined velocity profile. In this, the powders consist of ceramic or thermoplastic materials, inter alia thermoplastic polyurethane.

In WO 99/64216, prepregs and composites and a method for the production thereof are described, wherein emulsions with polymer particles so small that individual fibre coating is enabled are used. The polymers of the particles have a viscosity of at least 5000 centipoises and are either thermoplastics or crosslinking polyurethane polymers.

In EP 0590702, powder impregnations for the production of prepregs are described, wherein the powder consists of a mixture of a thermoplastic and a reactive monomer or prepolymers. WO 2005/091715 likewise describes the use of thermoplastics for the production of prepregs.

Michaeli et al. describe the development of a powder technology for a pultrusion process with thermoplastic polyurethanes, referred to as TPU, in Coatings & Composite Materials, No. 19, p37-39, 1997.

Further, in the article Processing and properties of thermoplastic polyurethane prepreg. (Ma, C. C. M.; Chiang, C. L. Annual Technical Conference—Society of Plastics Engineers (1991), 49th 2065-9.) thermoplastic polyurethane (TPU) prepregs based on TPU systems containing solvents and water are disclosed.

Prepregs with a matrix based on 2-component polyurethanes (2-C PUR) are known. The category of the 2-C PUR essentially comprises the standard reactive polyurethane resin systems. In principle, this is a system made up of two separate components. While the critical ingredient of one component is always a polyisocyanate, in the case of the second this is polyols, or with recent developments also amino- or amine-polyol mixtures. The two parts are only mixed together shortly before processing. Thereafter the chemical curing takes place by polyaddition with formation of a network of polyurethane or polyurea. After mixing of the two components, 2-component systems have a limited processing time (stand time, pot life), as the reaction that sets in leads to a gradual viscosity increase and finally to gelling of the system. However, many factors determine the effective duration of its processability: reactivity of the reaction partners, catalysis, concentration, solubility, moisture content, NCO/OH ratio and ambient temperature are the most important [Lackharze, Stoye/Freitag, Hauser-Verlag 1996, pages 210/212]. The disadvantage of the prepregs based on such 2-C PUR systems is that only a short time is available for the processing of the prepreg into a composite. Consequently such prepregs are not stable over several hours, let alone days.

Below there follows a description of the polyurethane prepregs or composites based on 2-C PUR systems. In the article by K. Recker, the development of a 2-C polyurethane system for the resin mat process with particular reference to the processing properties for SMC components is reported. (Baypreg—a novel POLYURETHANE material for the resin mat process, Recker, Klaus, Kunststoffe—Plastics 8, 1981).

WO 2005/049301 discloses a catalytically activated 2-C PUR system, wherein the polyisocyanate component and the polyol are mixed and processed into a composite by pultrusion.

In WO 2005/106155, fibre reinforced composites for the construction industry are disclosed, which are produced by the long fibre injection (LFI) technology with 2-C polyurethane systems.

In JP 2004196851, composites are described which are produced from carbon fibres and organic fibres, such as for example hemp, with the use of a matrix of 2-C PUR based on polymeric methylenediphenyl diisocyanate (MDI) and specific OH group-containing compounds.

EP 1 319 503 describes polyurethane composites wherein special polyurethane covering layers for a fibre laminate impregnated with a 2-C PUR resin, which coats a core layer (e.g. a paper honeycomb) are used. The 2-C PUR resin for example consists of MDI and a mixture of polypropylene triols and diols from ethylene oxide propylene oxide copolymers.

In WO 2003/101719, polyurethane-based composites and the methods of production are described. These are 2-C polyurethane resins with defined viscosities and specific gel times.

2-C PUR systems are also discussed in: "Fiber reinforced polyurethane composites: shock tolerant components with particular emphasis on armor plating" (Ratcliffe, Colin P.; Crane, Roger M.; Santiago, Armando L., AMD (1995), 211 (Innovative Processing and Characterization of Composite Materials), 29-37.) and in Fiber-reinforced polyurethane composites. I. Process feasibility and morphology. (Ma, Chen Chi M.; Chen, Chin Hsing. International SAMPE Symposium and Exhibition (1992), 37 (Mater. Work. You 21st Century), 1062-74.)

Apart from the different binder basis, moisture-curing lacquers largely correspond to analogous 2-C systems both in their composition and also in their properties. In principle, the same solvents, pigments, fillers and auxiliary substances are used. Unlike 2-C lacquers, for stability reasons these systems tolerate no moisture whatsoever before their application.

Also known are physically drying systems based on non-reactive PUR elastomers. These are high molecular weight, linear, thermoplastic urethanes from diols and diisocyanates, preferably MDI, TDI, HDI and IPDI. Such thermoplastic systems as a rule exhibit very high viscosities and hence also very high processing temperatures. This critically hinders their use for prepregs. In the production of prepregs with fibre composites, the use of powders in reactive systems is more unusual and until now has been limited to a few use fields. Probably the most common process for applying a powder onto a fibre surface is the fluidized bed process (fluidized bed impregnation). By means of an upwardly directed flow, powder particles are converted to a state wherein they exhibit fluid-like properties. This process is used in EP 590 702. In this, the strands of individual fibre bundles are floated apart and coated with the powder in the fluidized bed. The powder here consists of a mixture of reactive and thermoplastic powder, in order thus to optimize the properties of the matrix. Finally, individual rovings (fibre bundles) are laid together and several layers compressed under a pressure of 16 bar for about 20 minutes. The temperatures vary between 250 and 350° C. However, in the fluidized bed process irregular coating often occurs, in particular if the strands are not pulled apart.

Concerning this, in US 20040231598 a method is proposed which functions similarly to the fluidized bed process. In this, an air flow transports the particles to the substrate and a uniform deposition of the powder is effected through a specific configuration.

A further process is described in US 20050215148. There uniform distributions of the powder on the fibres are achieved with the device just mentioned. In this, the particle size ranges from 1 to 2000 µm. In several experiments, coating is effected from one or from two sides. Through the uniform application of the powder, laminates with no air inclusions are obtained after subsequent compression of the prepreg.

A further application, WO 2006/043019, describes the use of epoxy and amino-terminated resins in powder form. In this, the powders are mixed and applied onto the fibres. Next, the particles are sintered on. The particle size lies between 1 and 3000 µm, but preferably between 1 and 150 µm.

This restriction of the particle size to rather small diameters is also recommended in a study by the Michigan State University. The theory here is that particles with small diameters will more likely be able to penetrate into cavities between individual filaments than particles with larger diameters (S. Padaki, L. T. Drzal: a simulation study on the effects of particle size on the consolidation of polymer powder impregnated tapes, Department of Chemical Engineering, Michigan State University, Composites: Part A (1999), pp. 325-337).

Apart from the prepreg technology, reactive powder systems are also used in other standard processes, for example in winding technology [M. N. Ghasemi Nejhad, K. M. Ikeda: Design, manufacture and characterization of composites using on-line recycled thermoplastic powder impregnation of fibres and in-situ filament winding, Department of Mechanical Engineering, University of Hawaii at Manoa, Journal of Thermoplastic Composite Materials, Vol 11, pp. 533-572, November 1998] or in the pultrusion process. For the pultrusion process for example fibre strands (towpregs) are coated with the powder and firstly wound and stored as so-called towpregs. One possibility for their production is described in an article in the SAMPE Journal [R. E. Allred, S. P. Wesson, D. A. Babow: powder impregnation studies for high temperature towpregs, Adherent Technologies, SAMPE Journal, Vol. 40, No. 6, pp. 40-48, November/December 2004]. In a further study, such towpregs were pressed together by the pultrusion process and cured to give material components [N. C. Parasnis, K. Ramani, H. M. Borgaonkar: Ribbonizing of electrostatic powder spray impregnated thermoplastic tows by pultrusion, School of Mechanical Engineering, Purdue University, Composites, Part A, Applied science and manufacturing, Vol. 27, pp.

567-574, 1996]. Although the production of towpregs and subsequent compression in the pultrusion process had already been performed with duroplastic systems, to a large extent only thermoplastic systems have until now been used in this process.

In DE 102009001793.3 and DE 102009001806.9, a process is described for the production of storage-stable prepregs, consisting essentially of A) at least one fibrous support and B) at least one reactive polyurethane composition in powder form as the matrix material.

The objective was to find a simpler process for the production of simple to handle, that is non-toxic, polyurethane-based prepreg systems based on polyurethane compositions. A further objective of this invention was to find prepregs with polyurethane matrix material which can be produced by a simple process, wherein the main emphasis should be placed on the handling and storage life of the prepregs.

For the production of the prepregs it would be advantageous if the viscosity of preparations of the noncrosslinked matrix materials is low enough to ensure wetting of the fibrous support having sufficient fibre volume content during the production of the composite component, during which thixotropy can also be advantageous, so that run-off of the resin in vertical component segments can be prevented.

Through the choice of suitable starting materials for the production of the matrix materials, a sufficiently long processing time (depending on the particular application in the production of the composites) between the melting of the not completely reacted matrix material and the completion of the reaction should be ensured.

Storage-stable polyurethane prepregs and mouldings produced therefrom are known from DE 102009001793 and DE 102009001806.

DE 102010029355.5 relates to melt application for polyurethane prepreg systems.

DE 102010030233.3 describes polyurethane prepreg systems having complex curvature.

DE 102010030234.1 presents solvent-containing polyurethane prepreg systems.

DE 102010041239.2 claims coloured polyurethane prepreg systems. DE 102010041256.2 in turn deals with polyurethane prepreg systems on fixed foils, while DE 102010041243.0 describes polyurethane prepreg systems with a fibre volume content of less than 50%. A feature common to all of the said documents is that the resin components described therein (polymers b) must have solid resin character, i.e. a glass transition temperature (Tg) of at least 40° C. This high Tg has been considered hitherto to be necessary for ensuring the storage stability of the prepreg.

Surprisingly, it has now been found that these applications described in the sector of impregnated, reactive and storage-stable polyurethane prepregs can be realized with particular advantage if they use liquid resin components, preferably polyols, as resin component. The advantage in terms of process technology here is apparent not only in the production of the prepregs but also in the subsequent pressing to give composite components in terms of better processability, with no resultant sacrifice of the storage stability of the prepreg. In particular, the production of the prepregs proceeds without undesired blistering or other surface disruption. During subsequent pressing to give composites, the liquid resin components lead to improved flow within the layers and thus to superior properties of the material.

In addition, by virtue of the usually relatively low viscosity of the matrix material at relatively high temperatures the pressing to give the composite component can be carried out at relatively low pressures, and this can be advantageous.

Prepregs are thus obtained with at least the same or even improved processing properties as those described in DE 102009001793 or DE 102009001806, which can be used for the production of high performance composites for various applications in the sector of the construction, automobile, aerospace industry, energy technology (wind power plants) and in boat and ship-building. The reactive polyurethane compositions usable according to the invention are environmentally harmless, low cost, exhibit good mechanical properties, are easy to process and after curing are characterized by good weather resistance and a balanced relationship between rigidity and flexibility.

The subject matter of the invention is prepregs, comprising

A) at least one fibrous support
and
B) at least one reactive polyurethane composition as matrix material,
wherein the polyurethane compositions essentially contain mixtures of a liquid resin component b) having functional groups reactive towards isocyanates and having a Tg or melting point below 25° C., with an OH number of 50 to 2000 mg KOH/gram, and di- or polyisocyanates internally blocked and/or blocked with blocking agents as curing agents a).

The glass transition temperature Tg and the melting point are determined in accordance with DIN EN ISO 11357-1 and DIN 53765.

After cooling to room temperature, the prepregs according to the invention produced according to the invention exhibit very high storage stability at room temperature, provided that the matrix material has a Tg of at least 40° C. Depending on the reactive polyurethane composition contained and catalysis, this is at least several days at room temperature, but as a rule the prepregs are storage-stable for several weeks or even months at 40° C. and below. The prepregs thus produced are usually not sticky and are thus very easy to handle and to process further. Hence the reactive or highly reactive polyurethane compositions used according to the invention exhibit very good adhesion and distribution on the fibrous support. During the further processing of the prepregs to composites (composite materials) e.g. by compression at elevated temperatures, very good impregnation of the fibrous support takes place owing to the fact that the then liquid low viscosity reactive or highly reactive polyurethane compositions wet the fibres of the support very well before the crosslinking reaction, before a gelling occurs or the complete polyurethane matrix cures throughout due to the crosslinking reaction of the reactive or highly reactive polyurethane composition at elevated temperatures.

Depending on the composition of the reactive or highly reactive polyurethane composition used and catalysts that may have been added, both the rate of the crosslinking reaction in the production of the composite components and also the properties of the matrix can be varied over wide ranges.

In the context of the invention, the reactive or highly reactive polyurethane composition used for the production of the prepregs is defined as matrix material and in the description of the prepregs the still reactive or highly reactive polyurethane composition applied onto the fibres by the process according to the invention.

The matrix is defined as the matrix materials from the reactive or highly reactive polyurethane compositions crosslinked in the composite.

Support

The fibrous support in the present invention consists of fibrous material (also often referred to as reinforcing fibres). In general any material of which the fibres consist is suitable, however fibrous material of glass, carbon, plastics, such as for example polyamide (aramid) or polyester, natural fibres or mineral fibre materials such as basalt fibres or ceramic fibres (oxide fibres based on aluminium oxides and/or silicon oxides) is preferably used. Mixtures of fibre types, such as for example fabric combinations of aramid- and glass fibres, or carbon and glass fibres, can also be used. Likewise, hybrid composite components can be produced with prepregs from different fibrous supports.

Glass fibres are the most commonly used fibre types mainly owing to their relatively low price. In principle here, all types of glass-based reinforcing fibres are suitable (E glass, S glass, R glass, M glass, C glass, ECR glass, D glass, AR glass, or hollow glass fibres). Carbon fibres are generally used in high performance composite materials where the lower density with at the same time higher strength compared to glass fibres is also an important factor. Carbon fibres (also carbon fibres) are industrially produced fibres from carbon-containing starting materials which are converted by pyrolysis to carbon in graphite-like configuration. A distinction is made between isotropic and anisotropic types: isotropic fibres have only low strength values and lower industrial significance, anisotropic fibres exhibit high strength and rigidity values with at the same time low elongation at break.

Here, all textile fibres and fibre materials which are obtained from plant and animal material (e.g. wood, cellulose, cotton, hemp, jute, flax, sisal or bamboo fibres) are described as natural fibres.

Aramid fibres, similarly also to carbon fibres, have a negative coefficient of thermal expansion, i.e. become shorter on heating. Their specific strength and their modulus of elasticity is markedly lower than that of carbon fibres. In combination with the positive coefficient of expansion of the matrix resin, highly dimensionally stable components can be manufactured. Compared to carbon fibre reinforced plastics, the pressure resistance of aramid fibre composite materials is markedly lower. Well-known brand names for aramid fibres are Nomex® and Kevlar® from DuPont, or Teijinconex®, Twaron® and Technora® from Teijin. Supports made of glass fibres, carbon fibres, aramid fibres or ceramic fibres are particularly suitable. The fibrous material is a planar textile body. Planar textile bodies of non-woven material, likewise so-called knitted goods, such as hosiery and knitted fabrics, but also non-knitted skein such as fabric, non-woven or netting, are suitable. In addition, a distinction is made between long fibre and short fibre materials as supports. Also suitable according to the invention are rovings and yarns. All the said materials are suitable as fibrous supports in the context of the invention.

An overview of reinforcing fibres is contained in "Composites Technologien, Paolo Ermanni (Version 4), Script for Lecture ETH Zürich, August 2007, Chapter 7".

Matrix Material

In principle, all reactive polyurethane compositions, inclusive of other compositions which are storage-stable at room temperature, are suitable as matrix materials. According to the invention, suitable polyurethane compositions consist of mixtures of a liquid resin component b) having functional groups—reactive towards NCO groups—and having a Tg or melting point below 25° C., and di- or polyisocyanates temporarily deactivated, in other words internally blocked and/or blocked with blocking agents, also described as curing agent a) (component a)). The resin component b) is liquid at room temperature and therefore has no solid resin character. Resin component b) is preferably liquid at 20 to 23° C., and preferably below 20° C.

Suitable functional groups of the resin component b) are hydroxyl groups, amino groups and thiol groups, where these react with the free isocyanate groups in an addition reaction and thus crosslink and harden the polyurethane composition. Polyols are preferred. The resin components must be liquid at room temperature. That means that the resin components must have a Tg or melting point below 25° C. The resin component b) is preferably liquid at 20 to 23° C., and particularly preferably below 20° C.

Materials that can be used as resin component b) are monomeric polyols, polyesters, polycaprolactones, polyethers, polyacrylates, polycarbonates and polyurethanes with an OH number of 50 to 2000 mg KOH/gram and an average molar mass of 62 to 3000 g/mol.

The amount of resin component b) having functional groups is selected in such a way that there are preferably 0.6 to 2 NCO equivalents or 0.3 to 1 uretdione group of component a) for each functional group of component b).

It is preferable to use polyols with an OH number of 200 to 1500 mg KOH/gram, particularly preferably with an OH number of 501 to 1000 mg KOH/gram. It is very particularly preferable to use polyols with an OH number of 600 to 800 mg KOH/gram.

Preference is given to polyols with an average molecular weight of 100 to 1000 g/mol, particularly preferably with an average molecular weight of 100 to 500 g/mol.

Very particular preference is given to polyols with an OH number of 501 to 1000 mg KOH/gram which are liquid at 20 to 23° C. and preferably below 20° C.

Even more preferred are polyols with an OH number of 600 to 800 mg KOH/gram which are liquid at 20 to 23° C. and preferably below 20° C.

It is also possible, of course, to use mixtures of these resin components b). Examples of suitable polyols are:

|  | OH number (about) | Molar mass | Producer |
| --- | --- | --- | --- |
| Glycerol | 1800 | 92 | Perstorp |
| Polyol 3165 | 1010 | 165 | Perstorp |
| Polyol 3380 | 380 | 440 | Perstorp |
| Polyol 3610 | 610 | 280 | Perstorp |
| Polyol 3940 | 940 | 180 | Perstorp |
| Polyol 3990 | 990 | 170 | Perstorp |
| Polyol 4290 | 290 | 800 | Perstorp |
| Polyol 4360 | 360 | 630 | Perstorp |
| Polyol 4525 | 525 | 430 | Perstorp |
| Polyol 4640 | 640 | 360 | Perstorp |
| Polyol 4800 | 800 | 280 | Perstorp |
| Polyol R3215 | 215 | 1010 | Perstorp |
| Polyol R3430 | 430 | 400 | Perstorp |
| Polyol R3530 | 530 | 310 | Perstorp |
| Polyol R3540 | 540 | 310 | Perstorp |
| Polyol R3610 | 610 | 280 | Perstorp |
| Polyol R4631 | 630 | 280 | Perstorp |
| Polyol R6405 | 405 | 830 | Perstorp |
| Voranol CP 260 | 660 | 255 | Dow |
| Voranol CP 300 | 565 | 300 | Dow |
| Voranol CP 450 | 380 | 450 | Dow |
| Voranol CP 755 | 240 | 700 | Dow |
| Voranol CP 1055 | 155 | 1000 | Dow |
| Voranol RH 360 | 360 | 700 | Dow |
| Voranol RN 490 | 490 | 490 | Dow |

-continued

| | OH number (about) | Molar mass | Producer |
|---|---|---|---|
| Voranol RA 640 | 640 | 350 | Dow |
| Voranol RA 800 | 800 | 280 | Dow |
| Terathane 650 | 170 | 650 | DuPont |
| Terathane 1000 | 100 | 1000 | DuPont |
| Capa 3031 | 560 | 300 | Perstorp |
| Capa 3041 | 395 | 425 | Perstorp |
| Capa 3050 | 310 | 540 | Perstorp |
| Capa 3091 | 180 | 900 | Perstorp |
| Capa 4101 | 220 | 1000 | Perstorp |

It is also possible, of course, to use mixtures of these polyols b).

As the curing component a), di- and polyisocyanates blocked with blocking agents or internally blocked (uretdione) are used.

The di- and polyisocyanate used according to the invention can consist of any aromatic, aliphatic, cycloaliphatic and/or (cyclo)aliphatic di- and/or polyisocyanates.

As aromatic di- or polyisocyanates, in principle all known aromatic compounds are suitable. 1,3- and 1,4-phenylene diisocyanate, 1,5-naphthylene diisocyanate, toluidine diisocyanate, 2,6-toluylene diisocyanate, 2,4-toluylene diisocyanate (2,4-TDI), 2,4'-diphenylmethane diisocyanate (2,4'-MDI), 4,4'-diphenylmethane diisocyanate, the mixtures of monomeric diphenylmethane diisocyanates (MDI) and oligomeric diphenylmethane diisocyanates (polymer MDI), xylylene diisocyanate, tetramethylxylylene diisocyanate and triisocyanatotoluene are particularly suitable.

Suitable aliphatic di- or polyisocyanates advantageously have 3 to 16 carbon atoms, preferably 4 to 12 carbon atoms, in the linear or branched alkylene residue and suitable cycloaliphatic or (cyclo)aliphatic diisocyanates advantageously have 4 to 18 carbon atoms, preferably 6 to 15 carbon atoms, in the cycloalkylene residue. Those skilled in the art adequately understand (cyclo)aliphatic diisocyanates simultaneously to mean cyclically and aliphatically bound NCO groups, such as is for example the case with isophorone diisocyanate. In contrast to this, cycloaliphatic diisocyanates are understood to mean those which only have NCO groups directly bound to the cycloaliphatic ring, e.g. $H_{12}$MDI.

Examples are cyclohexane diisocyanate, methylcyclohexane diisocyanate, ethylcyclohexane diisocyanate, propylcyclohexane diisocyanate, methyldiethylcyclohexane diisocyanate, propane diisocyanate, butane diisocyanate, pentane diisocyanate, hexane diisocyanate, heptane diisocyanate, octane diisocyanate, nonane diisocyanate, nonane triisocyanate, such as 4-isocyanatomethyl-1,8-octane diisocyanate (TIN), decane di- and triisocyanate, undecane di- and triisocyanate and dodecane di- and triisocyanate.

Isophorone diisocyanate (IPDI), hexamethylene diisocyanate (HDI), diisocyanatodicyclohexylmethane (H12MDI), 2-methylpentane diisocyanate (MPDI), 2,2,4-trimethylhexamethylene diisocyanate/2,4,4-trimethylhexamethylene diisocyanate (TMDI), and norbornane diisocyanate (NBDI) are preferred. IPDI, HDI, TMDI and/or $H_{12}$MDI are quite particularly preferably used, the isocyanurates also being usable.

Also suitable are 4-methyl-cyclohexane 1,3-diisocyanate, 2-butyl-2-ethylpentamethylene diisocyanate, 3(4)-isocyanatomethyl-1-methylcyclohexyl isocyanate, 2-isocyanatopropylcyclohexyl isocyanate, 2,4'-methylenebis(cyclohexyl) diisocyanate and 1,4-diisocyanato-4-methyl-pentane.

Of course, mixtures of the di- and polyisocyanates can also be used.

Furthermore, oligo- or polyisocyanate which can be produced from the said di- or polyisocyanates or mixtures thereof by linkage by means of urethane, allophanate, urea, biuret, uretdione, amide, isocyanurate, carbodiimide, uretonimine, oxadiazinetrione or iminooxadiazinedione structures are preferably used. Isocyanurate, in particular from IPDI and/or HDI, are particularly suitable.

The polyisocyanates used according to the invention are blocked. Possible for this are external blocking agents such as for example ethyl acetoacetate, diisopropylamine, methyl ethyl ketoxime, diethyl malonate, ε-caprolactam, 1,2,4-triazole, phenol or substituted phenols and 3,5-dimethylpyrazole.

The curing components preferably used are IPDI adducts which contain isocyanurate groupings and ε-caprolactam blocked isocyanate structures.

Internal blocking is also possible and this is preferably used. The internal blocking is effected via dimer formation via uretdione structures which at elevated temperature again cleave back into the isocyanate structures originally present and hence set the crosslinking with the binder in motion.

Optionally, the reactive polyurethane compositions can contain additional catalysts. These are organometallic catalysts, such as for example dibutyltin dilaurate (DBTL), tin octoate, bismuth neodecanoate, or else tertiary amines, such as for example 1,4-diazabicyclo[2.2.2]-octane, in quantities of 0.001-1 wt. %. These reactive polyurethane compositions used according to the invention are cured under normal conditions, e.g. with DBTL catalysis, from 160° C., usually from ca. 180° C. and as indicated.

For the production of the reactive polyurethane compositions, the additives usual in coating powder technology, such as levelling agents, e.g. polysilicones or acrylates, light screening agents, e.g. sterically hindered amines, or other auxiliary substances such as were for example described in EP 669 353, can be added in a total quantity of 0.05 to 5 wt. %. Fillers and pigments such as for example titanium dioxide, or dyes, can be added in a quantity up to 50 wt. % of the total composition.

In the context of this invention reactive (modification I) means that the reactive polyurethane compositions used according to the invention cure as described above at temperatures from 160° C., this depending on the nature of the support.

The reactive polyurethane compositions used according to the invention are cured under normal conditions, e.g. with DBTL catalysis, from 160° C., usually from ca. 180° C. The time for the curing of the polyurethane composition used according to the invention is as a rule within 5 to 60 minutes.

Preferably used in the present invention is a matrix material B), from a polyurethane composition B) containing reactive uretdione groups, comprising a) at least one curing agent containing uretdione groups, based on polyaddition compounds from polyisocyanates containing aliphatic, (cyclo)aliphatic or cycloaliphatic uretdione groups and hydroxyl group-containing compounds, where the curing agent exists in solid form below 40° C. and in liquid form above 110° C. and has a free NCO content of less than 5 wt. % and a uretdione content of 3-25 wt. %, b) at least one hydroxyl group-containing liquid resin component b) having a Tg or melting point below 25° C. and an OH number between 50 and 2000, c) optionally at least one catalyst, d) optionally auxiliary agents and additives known from polyurethane chemistry, in such a way that the two components a) and b) are present in a ratio such that there is from 0.3 to 1 uretdione group of component a) for each hydroxyl group of component b), preferably from 0.45 to 0.55. The latter corresponds to an NCO/OH ratio of 0.9 to 1.1:1.

Polyisocyanates containing uretdione groups are well known and are for example described in U.S. Pat. Nos. 4,476,054, 4,912,210, 4,929,724 and EP 417 603. A comprehensive overview of industrially relevant processes for the dimerization of isocyanates to uretdiones is provided by J. Prakt. Chem. 336 (1994) 185-200. In general, the conversion of isocyanates to uretdiones is effected in the presence of soluble dimerization catalysts such as for example dialkylaminopyridines, trialkylphosphines, phosphorous acid triamides or imidazoles. The reaction—optionally performed in solvents, but preferably in the absence of solvents—is stopped by addition of catalyst poisons on attainment of a desired conversion level. Excess monomeric isocyanate is then removed by flash evaporation. If the catalyst is sufficiently volatile, the reaction mixture can be freed from catalyst in the course of the monomer separation. The addition of catalyst poisons can in this case be omitted. Essentially, a broad palette of isocyanates is suitable for the production of polyisocyanates containing uretdione groups. The aforesaid di- and polyisocyanate can be used. However di- and polyisocyanates from any aliphatic, cycloaliphatic and/or (cyclo)aliphatic di- and/or polyisocyanates are preferred. According to the invention, isophorone diisocyanate (IPDI), hexamethylene diisocyanate (HDI), diisocyanatodicyclohexylmethane ($H_{12}$MDI), 2-methylpentane diisocyanate (MPDI), 2,2,4-trimethylhexamethylene diisocyanate/2,4,4-trimethylhexamethylene diisocyanate (TMDI) or norbornane diisocyanate (NBDI) are used. Quite especially preferably, IPDI, HDI, TMDI and $H_{12}$MDI are used alone or in mixtures, and the isocyanurates can also be used.

Quite especially preferably, IPDI and/or HDI are used for the matrix material. The conversion of these polyisocyanates containing uretdione groups to curing agents a) containing uretdione groups comprises the reaction of the free NCO groups with hydroxyl group-containing monomers or polymers, such as for example polyesters, polythioethers, polyethers, polycaprolactams, polyepoxides, polyester amides, polyurethanes or lower molecular weight di, tri- and/or tetrahydric alcohols as chain extenders and optionally monoamines and/or monohydric alcohols as chain terminators and has already often been described (EP 669 353, EP 669 354, DE 30 30 572, EP 639 598 or EP 803 524).

Preferred curing agents a) having uretdione groups have a free NCO content of less than 5 wt. % and a content of uretdione groups of 3 to 25 wt. %, preferably 6 to 18 wt. % (calculated as $C_2N_2O_2$, molecular weight 84). Polyesters and monomeric dihydric alcohols are preferred. Apart from the uretdione groups the curing agents can also exhibit isocyanurate, biuret, allophanate, urethane and/or urea structures.

In the case of the hydroxyl group-containing liquid resin components b) it is preferable to use monomeric polyols, polyesters, polycaprolactones, polyethers, polyacrylates, polycarbonates and polyurethanes with an OH number of 50 to 2000 mg KOH/gram and an average molar mass of 62 to 3000 g/mol, where these have a Tg or melting point below 25° C.

It is preferable to use polyols with an OH number of 200 to 1500 mg KOH/gram, particularly preferably with an OH number of 501 to 1000 mg KOH/gram. Very particular preference is given to polyols with an OH number of 600 to 800 mg KOH/gram.

Preference is given to polyols with an average molecular weight of 100 to 1000 g/mol, particularly preferably with an average molecular weight of 100 to 500 g/mol.

Very particular preference is given to polyols with an OH number of 501 to 1000 mg KOH/gram, which are liquid at 20 to 23° C., and preferably below 20° C. Even more preferred are polyols with an OH number of 600 to 800 mg KOH/gram, which are liquid at 20 to 23° C., and preferably below 20° C.

It is also possible, of course, to use mixtures of these resin components. The amount used of the hydroxyl group-containing resin component b) is selected in such a way that there is from 0.3 to 1 uretdione group of component a), preferably from 0.45 to 0.55, for each hydroxyl group of component b).

Optionally, additional catalysts c) can also be contained in the reactive polyurethane compositions B) according to the invention. These are organometallic catalysts, such as for example dibutyl tin dilaurate, zinc octoate, bismuth neodecanoate, or else tertiary amines, such as for example 1,4-diazabicyclo[2.2.2]octane, in quantities of 0.001-1 wt. %. These reactive polyurethane compositions used according to the invention are cured under normal conditions, e.g. with DBTL catalysis, from 160° C., usually from ca. 180° C. and referred to as modification I.

For the production of the reactive polyurethane compositions according to the invention, the additives d) usual in lacquer, adhesive and sealant technology, such as levelling agents, e.g. polysilicones or acrylates, light screening agents, e.g. sterically hindered amines, or other additives such as were for example described in EP 669 353, can be added in a total quantity of 0.05 to 5 wt. %. Fillers and pigments such as for example titanium dioxide can be added in a quantity up to 30 wt. % of the total composition.

The reactive polyurethane compositions used according to the invention are cured under normal conditions, e.g. with DBTL catalysis, from 160° C., usually from about 180° C. The reactive polyurethane compositions used according to the invention provide very good flow and hence good impregnation behaviour and in the cured state excellent chemicals resistance. In addition, with the use of aliphatic crosslinking agents (e.g. IPDI or $H_{12}$MDI) good weather resistance is also achieved.

Particularly preferably in the invention a matrix material is used which is made from
B) at least one polyurethane composition containing highly reactive uretdione groups, comprising
   a) at least one curing agent containing uretdione groups and
   b) optionally at least one liquid resin component b) having a Tg or melting point below 25° C. and an OH number between 50 and 2000 mg KOH/gram, with functional groups reactive towards NCO groups;
   c) 0.1 to 5 wt. % of at least one catalyst selected from quaternary ammonium salts and/or quaternary phosphonium salts with halogens, hydroxides, alcoholates or organic or inorganic acid anions as the counter-ion; and
   d) 0.1 to 5 wt. % of at least one cocatalyst, selected from
     d1) at least one epoxide
     and/or
     d2) at least one metal acetylacetonate and/or quaternary ammonium acetylacetonate and/or quaternary phosphonium acetylacetonate;

e) optionally auxiliary substances and additives known from polyurethane chemistry.

Quite especially preferably, a matrix material B) made from

B) at least one highly reactive polyurethane composition containing uretdione groups as matrix material, comprising
   a) at least one curing agent containing uretdione groups, based on polyaddition compounds from aliphatic, (cyclo)aliphatic or cycloaliphatic polyisocyanates containing uretdione groups and hydroxyl group-containing compounds, where the curing agent exists in solid form below 40° C. and in liquid form above 110° C. and has a free NCO content of less than 5 wt. % and a uretdione content of 3-25 wt. %,
   b) at least one polyol having a Tg or melting point below 25° C. and an OH number between 50 and 2000 mg KOH/gram;
   c) 0.1 to 5 wt. % of at least one catalyst selected from quaternary ammonium salts and/or quaternary phosphonium salts with halogens, hydroxides, alcoholates or organic or inorganic acid anions as the counter-ion; and
   d) 0.1 to 5 wt. % of at least one cocatalyst, selected from
     d1) at least one epoxide
     and/or
     d2) at least one metal acetylacetonate and/or quaternary ammonium acetylacetonate and/or quaternary phosphonium acetylacetonate;
   e) optionally auxiliary substances and additives known from polyurethane chemistry,
is used so that the two components a) and b) are present in a ratio such that there is from 0.3 to 1 uretdione group of component a) for every hydroxyl group of component b), preferably from 0.6 to 0.9. The latter corresponds to an NCO/OH ratio of from 0.6 to 2:1 and preferably from 1.2 to 1.8:1. These highly reactive polyurethane compositions used according to the invention are cured at temperatures of 100 to 160° C. and are referred to as modification II.

Suitable polyurethane compositions containing highly reactive uretdione groups according to the invention contain mixtures of temporarily deactivated, i.e. uretdione group-containing (internally blocked) di- or polyisocyanates, also referred to as curing agents a) and the catalysts c) and d) contained according to the invention and optionally in addition a liquid resin component having functional groups—reactive towards NCO groups—and having a Tg or melting point below 25° C., with an OH number of 50 to 2000 mg KOH/gram, also referred to as resin b). The catalysts ensure curing of the polyurethane compositions containing uretdione groups at low temperatures. The polyurethane compositions containing uretdione groups are thus highly reactive.

Materials as described above are used as curing component a) containing uretdione groups.

Materials that can be used as liquid resin component b) are monomeric polyols, polyesters, polycaprolactones, polyethers, polyacrylates, polycarbonates and polyurethanes with an OH number of 50 to 2000 mg KOH/gram and an average molar mass of 62 to 3000 g/mol.

It is preferable to use liquid polyols with an OH number of 200 to 1500 mg KOH/gram, particularly preferably with an OH number of 501 to 1000 mg KOH/gram. Preference is given to polyols with an average molecular weight of 100 to 1000 g/mol, particularly preferably with an average molecular weight of 100 to 500 g/mol.

Very particular preference is given to polyols with an OH number of 501 to 1000 mg KOH/gram which are liquid at 20 to 23° C. and preferably below 20° C.

As catalysts under c), quaternary ammonium salts, tetralkylammonium salts and/or quaternary phosphonium salts with halogens, hydroxides, alcoholates or organic or inorganic acid anions as the counter-ion, are preferably used. Examples of these are: tetramethylammonium formate, tetramethylammonium acetate, tetramethylammonium propionate, tetramethylammonium butyrate, tetramethylammonium benzoate, tetraethylammonium formate, tetraethylammonium acetate, tetraethylammonium propionate, tetraethylammonium butyrate, tetraethylammonium benzoate, tetrapropylammonium formate, tetrapropylammonium acetate, tetrapropylammonium propionate, tetrapropylammonium butyrate, tetrapropylammonium benzoate, tetrabutylammonium formate, tetrabutylammonium acetate, tetrabutylammonium propionate, tetrabutylammonium butyrate and tetrabutylammonium benzoate and tetrabutylphosphonium acetate, tetrabutylphosphonium formate and ethyltriphenylphosphonium acetate, tetrabutylphosphonium benzotriazolate, tetraphenylphosphonium phenolate and trihexyltetradecylphosphonium decanoate, methyltributylammonium hydroxide, methyltriethylammonium hydroxide, tetramethylammonium hydroxide, tetraethylammonium hydroxide, tetrapropylammonium hydroxide, tetrabutylammonium hydroxide, tetrapentylammonium hydroxide, tetrahexylammonium hydroxide, tetraoctylammonium hydroxide, tetradecylammonium hydroxide, tetradecyltrihexylammonium hydroxide, tetraoctadecylammonium hydroxide, benzyltrimethylammonium hydroxide, benzyltriethylammonium hydroxide, trimethylphenylammonium hydroxide, triethylmethylammonium hydroxide, trimethylvinylammonium hydroxide, methyltributylammonium methanolate, methyltriethylammonium methanolate, tetramethylammonium methanolate, tetraethylammonium methanolate, tetrapropylammonium methanolate, tetrabutylammonium methanolate, tetrapentylammonium methanolate, tetrahexylammonium methanolate, tetraoctylammonium methanolate, tetradecylammonium methanolate, tetradecyltrihexylammonium methanolate, tetraoctadecylammonium methanolate, benzyltrimethylammonium methanolate, benzyltriethylammonium methanolate, trimethylphenylammonium methanolate, triethylmethylammonium methanolate, trimethylvinylammonium methanolate, methyltributylammonium ethanolate, methyltriethylammonium ethanolate, tetramethylammonium ethanolate, tetraethylammonium ethanolate, tetrapropylammonium ethanolate, tetrabutylammonium ethanolate, tetrapentylammonium ethanolate, tetrahexylammonium ethanolate, tetraoctylammonium methanolate, tetradecylammonium ethanolate, tetradecyltrihexylammonium ethanolate, tetraoctadecylammonium ethanolate, benzyltrimethylammonium ethanolate, benzyltriethylammonium ethanolate, trimethylphenylammonium ethanolate, triethylmethylammonium ethanolate, trimethylvinylammonium ethanolate, methyltributylammonium benzylate, methyltriethylammonium benzylate, tetramethylammonium benzylate, tetraethylammonium benzylate, tetrapropylammonium benzylate, tetrabutylammonium benzylate, tetrapentylammonium benzylate, tetrahexylammonium benzylate, tetraoctylammonium benzylate, tetradecylammonium benzylate, tetradecyltrihexylammonium benzylate, tetraoctadecylammonium benzylate, benzyltrimethylammonium benzylate, benzyltriethylammonium benzylate, trimethylphenylammonium benzylate, triethylmethylammonium benzylate, trimethylvinylammonium benzylate, tetramethylammonium fluoride, tetraethylammonium fluoride, tetrabutylammonium fluoride, tetraoctylammonium fluoride, benzyltrimethylammonium fluoride, tetrabutylphosphonium hydroxide, tetrabutylphosphonium fluoride, tetrabutylammonium chloride, tetrabutylammonium bromide, tetrabutylammonium iodide, tetraethylammonium chloride, tetraethylammonium bromide, tetraethylammonium iodide, tetramethylammonium chloride, tetramethylammonium bromide, tetramethylammonium iodide, benzyltrimethylammonium chloride, benzyltriethylammonium chloride, benzyltripropylammonium chloride, benzyltributylammonium chloride, methyltributylammonium chloride, methyltripropylammonium chloride, methyltriethylammonium chloride, methyltriphenylammonium chloride, phenyltrimethylammonium chloride, benzyltrimethylammonium bromide, benzyltriethylammonium bromide, benzyltripropylammonium bromide, benzyltributylammonium bromide, methyltributylammonium bromide, methyltripropylammonium bromide, methyltriethylammonium bromide, methyltriphenylammonium bromide, phenyltrimethylammonium bromide, benzyltrimethylammonium iodide, benzyltriethylammonium iodide, benzyltripropylammonium iodide, benzyltributylammonium iodide, methyltributylammonium iodide, methyltripropylammonium iodide, methyltriethylammonium iodide, methyltriphenylammonium iodide and phenyltrimethylammonium iodide, methyltributylammonium hydroxide, methyltriethylammonium hydroxide, tetramethylammonium hydroxide, tetraethylammonium hydroxide, tetrapropylammonium hydroxide, tetrabutylammonium hydroxide, tetrapentylammonium hydroxide, tetrahexylammonium hydroxide, tetraoctylammonium hydroxide, tetradecylammonium hydroxide, tetradecyltrihexylammonium hydroxide, tetraoctadecylammonium hydroxide, benzyltrimethylammonium hydroxide, benzyltriethylammonium hydroxide, trimethylphenylammonium hydroxide, triethylmethylammonium hydroxide, trimethylvinylammonium hydroxide, tetramethylammonium fluoride, tetraethylammonium fluoride, tetrabutylammonium fluoride, tetraoctylammonium fluoride and benzyltrimethylammonium fluoride. These catalysts can be added alone or in any desired mixture. Preferably tetraethylammonium benzoate and/or tetrabutylammonium hydroxide are used.

The content of catalysts c) can be from 0.1 to 5 wt. %, preferably from 0.3 to 2 wt. %, based on the whole formulation of the matrix material.

One modification according to the invention modification also includes the binding of such catalysts c) to the functional groups of the polymers b). In addition, these catalysts can be surrounded with an inert shell and thus be encapsulated.

As cocatalysts d1) epoxides are used. Possible here are for example glycidyl ethers, glycidyl esters, aliphatic epoxides, diglycidyl ethers based on bisphenol A and/or glycidyl methacrylates. Examples of such epoxides are triglycidyl isocyanurate (TGIC, trade name ARALDIT 810, Huntsman), mixtures of diglycidyl terephthalate and triglycidyl trimellitate (trade name ARALDIT PT 910 and 912, Huntsman), glycidyl esters of versatic acid (trade name KARDURA E10, Shell), 3,4-epoxycyclohexylmethyl 3',4'-epoxycyclohexanecarboxylate (ECC), diglycidyl ethers based on bisphenol A (trade name EPIKOTE 828, Shell) ethylhexylglycidyl ether, butylglycidyl ether, pentaerythritol tetraglycidyl ether, (trade name POLYPDX R 16, UPPC AG) and other Polypox types with free epoxy groups. Mixtures can also be used. Preferably mixtures of diglycidyl terephthalate and triglycidyl trimellitate (ARALDIT PT 910 and/or 912) are used.

As cocatalysts d2) metal acetylacetonates are possible. Examples thereof are zinc acetylacetonate, lithium acetylacetonate and tin acetylacetonate, alone or in mixtures. Preferably zinc acetylacetonate is used.

As cocatalysts d2) quaternary ammonium acetylacetonates or quaternary phosphonium acetylacetonates are also possible.

Examples of such catalysts are tetramethylammonium acetylacetonate, tetraethylammonium acetylacetonate, tetrapropylammonium acetylacetonate, tetrabutylammonium acetylacetonate, benzyltrimethylammonium acetylacetonate, benzyltriethylammonium acetylacetonate, tetramethylphosphonium acetylacetonate, tetraethylphosphonium acetylacetonate, tetrapropylphosphonium acetylacetonate, tetrabutylphosphonium acetylacetonate, benzyltrimethylphosphonium acetylacetonate and benzyltriethylphosphonium acetylacetonate. Particularly preferably, tetraethylammonium acetylacetonate and/or tetrabutylammonium acetylacetonate are used. Mixtures of such catalysts can of course also be used.

The content of cocatalysts d1) and/or d2) can be from 0.1 to 5 wt. %, preferably from 0.3 to 2 wt. %, based on the whole formulation of the matrix material.

By means of the highly reactive and thus low temperature curing polyurethane compositions B) used according to the invention, at 100 to 160° C. curing temperature not only can energy and curing time be saved, but many temperature-sensitive supports can also be used.

In the context of this invention, highly reactive (modification II) means that the polyurethane compositions containing uretdione groups used according to the invention cure at temperatures from 100 to 160° C., depending on the nature of the support. This curing temperature is preferably 120 to 150° C., particularly preferably from 130 to 140° C. The time for the curing of the polyurethane composition used according to the invention is generally within from 1 to 60 minutes.

The reactive or highly reactive polyurethane compositions used according to the invention provide very good flow and hence good impregnation behaviour and in the cured state excellent chemicals resistance. In addition, with the use of aliphatic crosslinking agents (e.g. IPDI or $H_{12}MDI$) good weather resistance is also achieved.

The prepregs produced according to the invention, and also the composite components, have a fibre volume content of more than 10%, preferably of 50-70%, particularly preferably of 50 to 65%.

The matrix material B) can be a high-viscosity material, or liquid or solid. The matrix material B) generally has a Tg or melting point of at least 30° C.

The reactive or highly reactive polyurethane compositions used according to the invention as matrix material essentially consist of a mixture of a reactive resin and a curing agent. This mixture as a rule reacts only above 160° C. in the case of the reactive polyurethane compositions, or above 100° C. in the case of the highly reactive polyurethane compositions, to give a crosslinked polyurethane and thus forms the matrix of the composite. This means that the prepregs according to the invention after their production are made up of the support and the applied reactive polyurethane composition as matrix material, which is present in noncrosslinked but reactive form.

The prepregs are thus storage-stable, as a rule for several days and even weeks and months and can thus at any time be further processed into composites. This is the essential difference from the 2-component systems already described above, which are reactive and not storage-stable, since after application these immediately start to react and crosslink to give polyurethanes.

Also subject matter of the invention is a process for the production of prepregs consisting essentially of
A) at least one fibrous support
and
B) at least one reactive polyurethane composition as matrix material,
wherein the polyurethane compositions essentially contain mixtures of a liquid resin component b) having functional groups reactive towards isocyanates and having a Tg or melting point below 25° C. and an OH number between 50 and
2000 mg KOH/gram;
and di- or polyisocyanates internally blocked and/or blocked with blocking agents as curing agents a),
I. by production of the reactive polyurethane composition B),
and
II. impregnation of the fibrous support A) with the polyurethane composition B), which has optionally been dissolved in solvent,
III. and optional removal of the solvent.

The matrix material B) can be a high-viscosity material, or liquid or solid. The matrix material B) generally has a Tg or melting point of at least 30° C.

The principle of the process for the production of prepregs is that first a reactive polyurethane composition B) is produced from its individual components, optionally in a suitable shared solvent. This combination of the reactive polyurethane composition B) and optionally solvent is then applied to the fibrous support A), preferably directly after the production of the reactive polyurethane composition B), where the fibrous support is impregnated. The optional solvent is then optionally removed. It is preferable that the solvent is completely removed at low temperature, preferably <160° C., particularly preferably <100° C., by, for example, heat treatment or application of vacuum.

The storable prepregs can then at a subsequent juncture be further processed to give composites. The process according to the invention gives very good impregnation of the fibrous support, because liquid resin components b) make the reactive polyurethane compositions capable of very good wetting of the fibre of the support. It is also markedly easier to remove optionally used solvents when liquid resin components b) are used. During the subsequent pressing to give composites, the liquid resin components lead to better flow within the layers and thus to superior properties of the material.

The production of the polyurethane composition B) for the production of the prepregs can take place in suitable assemblies, e.g. heatable stirred tanks, kneaders, or else extruders, but upper temperature limits of 100° C. should not be exceeded here.

Suitable solvents that can be used for the process according to the invention are any of the aprotic liquids which are not reactive towards the reactive polyurethane compositions, have adequate ability to dissolve the individual components used in the reactive polyurethane composition, and for the purposes of the solvent removal step of the process can be drawn off except for slight traces (<0.5% by weight) from the prepreg impregnated with the reactive polyurethane composition, and it is advantageous here that the solvent removed is recycled. Examples that may be mentioned here are: ketones (acetone, methyl ethyl ketone, methyl isobutyl ketone, cyclohexanone), ethers (tetrahydrofuran), esters (n-propyl acetate, n-butyl acetate, isobutyl acetate, propylene 1,2-carbonate, propylene glycol methyl ether acetate).

The production of the prepregs by the said impregnation process, optionally with solvents, can in principle take place according to the invention by any desired methods and by means of the known plants and apparatuses.

Solution impregnation is used inter alia for the production of epoxy composites ["Composites Technologien (Technologies of composites), Paolo Ermanni (Version 4), script for paper to be given at ETH Zürich, August 2007, Chapter 4.2.2"]. However, that publication makes no mention of reactive polyurethane compositions in solution.

The impregnation of the fibre can alternatively also take place without solvent in the direct melt process.

Subject matter of the invention is a direct melt impregnation process for the production of prepregs
consisting essentially of
A) at least one fibrous support
and
B) at least one reactive polyurethane composition as matrix material,
wherein the polyurethane compositions essentially contain mixtures of a liquid resin component b) having functional groups reactive towards isocyanates and having a Tg or melting point below 25° C. and an OH number between 50 and
2000 mg KOH/gram;
and di- or polyisocyanates internally blocked and/or blocked with blocking agents as curing agents a),
I. by production of the reactive polyurethane composition B) in the melt,
and
II. direct impregnation of the fibrous support A) with the melt from B).

The principle of the direct melt impregnation process for the prepregs consists in first producing a reactive polyurethane composition B) from its individual components. This melt of the reactive polyurethane composition B) is then applied directly to the fibrous support A), i.e. impregnation of the fibrous support A) with the melt from B) takes place. The cooled storable prepregs can then be further processed at a subsequent juncture to give composites. The direct melt impregnation process according to the invention gives very good impregnation of the fibrous support because the low-viscosity liquid reactive polyurethane compositions here wet the fibre of the support very effectively, and prior melt homogenization here avoids any thermal stressing of the polyurethane composition which can lead to the onset of a crosslinking reaction, and moreover there are now no process steps for milling and sieving to give individual particle size fractions, and the yield achieved of impregnated fibrous support is therefore higher.

The high temperatures necessary at least for a short time in the conventional melt impregnation process or in the incipient sintering of reactive polyurethane compositions in powder form are not required to the same extent in this process according to the invention, since the liquid resin components lead to markedly reduced melt viscosities. The only possible thermal stressing of the reactive polyurethane compositions will occur during the removal of the optionally used solvent after the impregnation process, where temperatures of 80 to 100° C. should not be exceeded, in order to avoid or minimize incipient reaction of the reactive matrix material.

The prepregs can if required be combined to give various shapes and cut to size.

For the consolidation of the prepregs to give a single composite and for the crosslinking of the matrix material to give the matrix, the prepregs are cut to size, optionally sewn together or fixed in any other manner, and pressed in a suitable mould under pressure and optionally with application of vacuum. For the purposes of this invention, this procedure for the production of the composites from the prepregs takes place at temperatures which depend on hardening time and are above about 160° C. when reactive matrix materials are used (variant I), or at temperatures above 100° C. when highly reactive matrix materials provided with appropriate catalysts are used (variant II).

Also subject matter of the invention are prepregs with a fixed foil C) on the composite surface.

Multilayer foils that can be used are lamination foils based on thermoplastics or mixtures or, respectively, compounded materials derived from these, e.g. made of thermoplastic polyurethanes (TPUs), of thermoplastic polyolefins (TPOs), of (meth)acrylic polymers, of polycarbonate foils (e.g. Lexan SLX from Sabic Innovative Plastics), of polyamides, of polyetheresteramides, of polyetheramides, of polyvinylidene difluoride (e.g. SOLIANT FLUOREX films from SOLIANT, AkzoNobel, or AVLOY from Avery) or metallized or metallic foils, e.g. aluminium, copper or other materials, where adhesion to the still reactive or highly reactive matrix systems containing uretdione groups takes place before production of the prepregs is complete. Further fixing of the foil moreover also takes place during the further processing of the prepregs to give the hardened polyurethane laminate surfaces of the composites. The lamination foils based on thermoplastic materials can be either foils bulk-coloured by pigments and/or dyes or else printed foils or foils lacquered on the exterior surface.

The lamination foil has a thickness between 0.2 and 10 mm, preferably between 0.5 and 4 mm. The softening point is between 80 and 260° C., preferably between 110 and 180° C., particularly preferably between 130 and 180° C. for the storage-stable highly reactive polyurethane compositions and between 130 and 220° C. for the reactive polyurethane compositions, and particularly preferably between 160 and 220° C.

Suitable foils are by way of example also described in WO 2004/067246.

According to the invention, the fixing of the lamination foil on the prepreg takes place directly during the production of the prepreg. The fixing of the foil here is achieved via adhesion through the matrix, depicted by way of example in FIG. 1, by lamination of the prepreg in situ at prepreg drying temperatures (sub-crosslinking temperatures, meaning the temperature below the onset temperature for the crosslinking of the matrix material). The said fixing generally takes place at temperatures of 50 to 110° C.

In another method for the fixing of the lamination foil on the prepreg, a prepreg is first produced in a first step and, in a second step, the foil is applied and fixed to the prepreg which has already been separately produced later. The fixing of the foil here is achieved by adhesion via the matrix, by lamination of the prepreg at prepreg drying temperatures (sub-crosslinking temperatures). The said fixing generally takes place at temperatures of 50 to 110° C.

The storage-stable prepregs thus produced, provided with lamination foils, can also be processed with further prepregs (unlaminated) to give laminates or, respectively, sandwich components by means of suitable processes, e.g. autoclave processes or press moulding processes.

An alternative to the use of a lamination foil is the separate production of a decorative coating layer or foil made of material which is based on reactive or highly reactive polyurethane compositions B) and which is the same as, or uses a formulation similar to that of, that used to produce the storage-stable prepregs according to the invention.

Another alternative (and embodiment of the invention) for a prepreg according to the invention exhibits a particular surface quality through a markedly increased matrix:fibre ratio. It accordingly has a very small fibre volume content. The fibre volume content set in this embodiment for a particularly smooth and/or coloured composite component surface is <50%, preferably <40%, particularly preferably <35%.

The production of the laminated prepregs or dual-layer prepregs according to the invention can be performed by means of the known plants and equipment by reaction injection moulding (RIM), reinforced reaction injection moulding (RRIM), or pultrusion processes, by applying the solution in a roll mill or by means of a hot doctor knife, or other processes.

Also subject matter of the invention is the use of the prepregs, in particular with fibrous supports of glass, carbon or aramid fibres.

Also subject matter of the invention is the use of the prepregs according to the invention, for the production of composites in boat and shipbuilding, in aerospace technology, in automobile manufacture, and for bicycles, preferably motorcycles and cycles, and in the sectors automotive, transportation, construction, medical engineering, sport, electrical and electronics industry, and power generating plants, e.g. for rotor blades in wind power plants.

Also subject matter of the invention are the prepregs produced by the process according to the invention.

Also subject matter of the invention are the composite components produced from the prepregs according to the invention.

Below, the invention is illustrated by examples.

EXAMPLES

Glass Fibre Nonwovens/Fabrics Used:

The following glass fibre nonwovens/fabrics were used in the examples:

Glass filament fabric, 296 g/m$^2$—Atlas, Finish FK 144 (Interglas 92626)

Production of the Uretdione-Containing Curing Agent H:

119.1 g of IPDI uretdione (Evonik Degussa GmbH) were dissolved in 100 ml of butyl acetate, and 27.5 g of methylpentanediol and 3.5 g of trimethylolpropane were admixed therewith. After addition of 0.01 g of dibutyltin dilaurate, the mixture was heated to 80° C. for 4 h, with stirring. No residual free NCO groups were then detectable by titration. The curing agent H has an effective latent NCO content of 12.8% by weight (based on solid).

Reactive Polyurethane Composition

Reactive polyurethane compositions were used for the production of the prepregs and the composites.

| Comparative Example 1 (not according to the invention) | | | |
|---|---|---|---|
| Curing agent H (60%) (effective NCO: 7.7%) | Curing component a) containing uretdione groups | 25.5% by wt. | Evonik Industries |
| Uralac P1580 (OHN 83 mg | Hydroxyl polyester | 34.7% by wt. | Cytec Industries |

-continued

| Comparative Example 1 (not according to the invention) | | | |
|---|---|---|---|
| KOH/g) resin b) molar mass about 1500 g/mol Tg 51° C. | | | Inc. |
| Benzoin | Devolatizing agent | 0.2% by wt. | Aldrich |
| Butyl acetate | Solvent c) | 39.8% by wt. | Fluka |

| Inventive Example 2 (according to the invention) | | | |
|---|---|---|---|
| Curing agent H (60%) (effective NCO: 7.7%) | Curing component a) containing uretdione groups | 65.3% by wt. | Evonik Industries |
| Polyol 4640 (OHN 630 mg KOH/g) molar mass 360 g/mol liquid | Polyol b) | 10.9% by wt. | Perstorp |
| Benzoin | Devolatizing agent | 0.2% by wt. | Aldrich |
| Butyl acetate | Solvent c) | 23.9% by wt. | Fluka |

| Inventive Example 3 (according to the invention) | | | |
|---|---|---|---|
| Curing agent H (60%) (effective NCO: 7.7%) | Curing component a) containing uretdione groups | 68.5% by wt. | Evonik Industries |
| Voranol 490 (OHN 490 mg KOH/g) molar mass 490 g/mol liquid | Polyol b) | 13.9% by wt. | Dow |
| Benzoin | Devolatizing agent | 0.2% by wt. | Aldrich |
| Butyl acetate | Solvent c) | 17.4% by wt. | Fluka |

| Inventive Example 4 (according to the invention) | | | |
|---|---|---|---|
| catalysed | | | |
| Curing agent H (60%) (effective NCO: 7.7%) | Curing component a) containing uretdione groups | 60.1% by wt. | Evonik Industries |
| Polyol 4640 (OHN 630 mg KOH/g) molar mass 360 g/Mol liquid | Polyol b) | 8.5% by wt. | Perstorp |
| Tetraethyl- ammonium benzoate | Catalyst | 0.5% by wt. | Evonik Industries |
| Araldit PT 912 | Epoxide | 1.5% by wt. | Huntsman |
| Oxalic acid | Acid | 0.2% by wt. | Aldrich |
| Benzoin | Devolatizing agent | 0.2% by wt. | Aldrich |
| Butyl acetate | Solvent c) | 30.4% by wt. | Fluka |

OHN=hydroxyl number

The starting materials from the table were mixed intimately in a premixer and then dissolved in the stated solvent.

For the production of the prepreg, the glass fibre fabric was impregnated with the solution of the matrix materials. The prepregs were dried to constant weight in an oven at temperatures of 50 to 70° C., with application of vacuum. The fibre mass content was determined as 49% in Comparative Example 1 (10 tests), 55% in Inventive Example 2 (10 tests), 48% in Inventive Example 3 (10 tests) and 52% in Inventive Example 4 (10 tests).

The prepreg of Comparative Example 1 exhibited severe blistering during removal of the solvent, presumably because of the high viscosity, and this gave a very irregular surface.

This prepreg could not therefore be further processed.

The prepreg according to the invention of Inventive Example 2 gave, in contrast, after removal of the solvent, a coherent surface without blistering. This prepreg could be further processed successfully. The prepreg according to the invention of Inventive Example 3 gave, after removal of the solvent, a coherent surface with little blistering. This prepreg could be further processed successfully, although not as successfully as Inventive Example 2. The prepreg according to the invention of Inventive Example 4 gave, after removal of the solvent, a coherent surface without blistering. This prepreg could be further processed successfully.

DSC Measurements

The DSC tests (glass transition temperature determinations and enthalpy of reaction measurements) are performed with a Mettler Toledo DSC 821e as per DIN 53765.

The DSC studies on the prepregs from Examples 1 and 2 give the following results:

TABLE 1

| DSC studies prior to and after storage at 40° C. | | | | |
|---|---|---|---|---|
| | CEx. 1 | Inv. Ex. 2 | Inv. Ex. 3 | Inv. Ex. 4 |
| Exothermic peak (1st heating procedure) in ° C. | 200 | 203 | 196 | 174 |
| Exothermic peak (1st heating procedure), enthalpy of reaction in J/g | 36 | 95 | 103 | 39 |
| Tg (2nd heating procedure) in ° C. | 94 | 97 | 119 | 121 |
| Exothermic peak (1st heating procedure) in ° C. after 28 days of storage at 40° C. | 203 | 202 | 198 | 180 |
| Exothermic peak (1st heating procedure), enthalpy of reaction in J/g after storage for 28 days at 40° C. | 33 | 90 | 98 | 51 |
| Tg (2nd heating procedure) in ° C. after 28 days of storage at 40° C. | 92 | 96 | 103 | 117 |

The glass transition temperatures measured in the second heating procedure are the glass transition temperatures of the fully crosslinked/reacted matrix material.

The DSC studies on the prepregs from Examples 1, 2, 3 and 4 prior to and after storage can be found in Table 1. The enthalpies of reaction measured for the prepregs according to the invention of Inventive Examples 2, 3 and 4 do not decrease significantly during the course of storage, and this is evidence of the storage stability of the matrix material.

Composite Component Production

The composite components were produced on a composite press by a compression technique known to those skilled in the art. The homogeneous prepregs produced by direct impregnation were compressed into composite materials on a benchtop press. This benchtop press is the Polystat 200 T from the firm Schwabenthan, with which the prepregs were compressed to the corresponding composite sheets at temperatures between 120 and 200° C. The pressure was varied between normal pressure and 450 bar.

In Inventive Examples 2 and 3, the temperature of the press was set to 150° C. and increased to 180° C. during the course of the pressing process, and the pressure was increased to 5 bar after a short melting phase of 3 minutes and was retained until removal of the composite component from the press after up to 30 minutes. The hard, rigid, chemicals resistant and impact resistant composite components (sheet products) were tested for degree of curing (determination by DSC). With the polyurethane composition used, crosslinking is complete after about 20 minutes, whereupon there is also no residual enthalpy of reaction detectable for the crosslinking reaction.

In Inventive Example 4 (catalysed version), the temperature of the press was set to 150° C. and increased to 180° C. during the course of the pressing process, and the pressure was increased to 5 bar after a short melting phase of 3 minutes and was retained until removal of the composite component from the press after up to 10 minutes. The hard, rigid, chemicals resistant and impact resistant composite components (sheet products) were tested for degree of curing (determination by DSC). With the polyurethane composition used, crosslinking is complete after about 20 minutes, whereupon there is also no residual enthalpy of reaction detectable for the crosslinking reaction.

Blistering prevented pressing of the prepreg of Comparative Example 1, which is not according to the invention.

The invention claimed is:

1. A prepreg, comprising:
   A) a fibrous support and
   B) a reactive polyurethane composition comprising:
      a) a curing agent containing uretdione groups, based on polyaddition compounds from aliphatic, (cyclo)aliphatic or cycloaliphatic polyisocyanates containing uretdione groups and hydroxyl group-containing compounds, where the curing agent exists in solid form below 40° C. and in liquid form above 110° C., and has a free NCO content of less than 5 wt.% and a uretdione content of 3-25 wt.%,
      b) at least one hydroxyl group-containing liquid resin component b) having a glass transition temperature (Tg) or melting point below 25° C. and an OH number between 50 and 2000 mg KOH/gram,
      c) optionally at least one catalyst,
      d) optionally auxiliary substances and additives,
      wherein components a) and b) are present in a ratio such that there is from 0.3 to 1 uretdione group of component a) for each hydroxyl group of component b) and
   the curing agent does not comprise an external blocking agent.

2. The prepreg of claim 1, wherein a melting point of the reactive polyurethane composition is at least 30° C.

3. The prepreg of claim 1, wherein a glass transition temperature (Tg) of the reactive polyurethane composition is at least 30° C.

4. The prepreg of claim 1, wherein the fibrous support comprises a glass fiber, a carbon fiber, a plastic fiber, a natural fiber or a mineral fiber.

5. The prepreg of claim 1, wherein the fibrous support comprises a planar textile body of non-woven material, a knitted good, or a non-knitted skein.

6. The prepreg of claim 1, wherein the aliphatic, (cyclo) aliphatic or cycloaliphatic polyisocyanate is at least one member selected from the group consisting of isophorone diisocyanate (IPDI), hexamethylene diisocyanate (HDI), diisocyanatodicyclohexylmethane ($H_{12}MDI$), 2-methylpentane diisocyanate (MPDI), 2,2,4-trimethylhexamethylene diisocyanate/2,4,4-trimethyl-hexamethylene diisocyanate (TMDI), and norbornane diisocyanate (NBDI).

7. The prepreg of claim 1, wherein the aliphatic, (cyclo) aliphatic or cycloaliphatic polyisocyanate comprises an isophorone diisocyanate adduct comprising an isocyanurate grouping.

8. The prepreg of claim 1, wherein the reactive polyurethane composition comprises the at least one catalyst c) and a content of the catalyst c) is from 0.001 to 1 wt.% based on the total weight of the reactive polyurethane composition.

9. The prepreg of claim 1, wherein the prepreg comprises the at least one catalyst c):
   a content of the catalyst c) is from 0.1 to 5 wt.%, based on the total weight of the reactive polyurethane composition,
   the catalyst c) comprises a quaternary ammonium salt or a quaternary phosphonium salt, having a halogen, a hydroxide, an alcoholate, or an organic or inorganic acid anion as a counter-ion; and the prepeg comprises at least one cocatalyst as additive d),
   a content of the at least one cocatalyst is from 0.1 to 5 wt.%, based on the total weight of the reactive polyurethane composition, and
   the at least one cocatalyst is selected from the group consisting of d1) and d2):
      d1) an epoxide
      and
      d2) a metal acetylacetonate, a quaternary ammonium acetylacetonate, or a quaternary phosphonium acetylacetonate; and
   the prepeg further optionally comprises e) an auxiliary substance or additive.

10. The prepreg of claim 1, which comprises the at least one catalyst c) and the catalyst c) is selected from the group consisting of tetramethylammonium fotimiate, tetramethylammonium acetate, tetramethylammonium propionate, tetramethylammonium butyrate, tetramethylannnonium benzoate, tetraethylaminoniumn formate, tetraethylammoniinn acetate, tetraethylammonium propionate, tetraethylammonium butyrate, tetraethylammonium benzoate, tetrapropylammonium formate, tetrapropylammonium acetate, tetrapropylammonium propionate, tetrapropylammonium butyrate, tetrapropylammonium benzoate, tetrabutylammonium formate, tetrabutylammonium acetate, tetrabutylammonium propionate, tetrabutylammonium butyrate and tetrabutyl-ammonium benzoate and tetrabutylphosphonium acetate, tetrabutylphosphonium formate and ethyltriphenylphosphonium acetate, tetrabutylphosphonium benzotriazolate, tetraphenyl-phosphonium phenolate and trihexylletradecylphosphonium decanoate, methyltributyl-ammonium hydroxide, methyltriethylammonium hydroxide, tetramethylammonium hydroxide, tetraethylammonium hydroxide, tetrapropylammonium hydroxide, tetrabutylammonium hydroxide, tetrapentylammonium hydroxide, tetrahexylammonium hydroxide, tetrabutyl-ammonium hydroxide, tetradecylammonium hydroxide, tetradecyltrihexylammonium hydroxide, tetraoctadecylammonium hydroxide, benzyltrimethylammonium hydroxide, benzyltriethylammonium hydroxide, trimethylphenylammonium hydroxide, triethylmethyl-ammonium hydroxide, trimethylvinylammonium hydroxide, methyltributylammonium methanolate, methyltriethylammonium methanolate, tetramethylammonium methanolate, tetraethylammonium methanolate, tetrapropylammonium methanolate, tetrabutylammonium methanolate, tetrapentylammonium methanolate, tetrahexylammonium methanolate, tetraoctylammonium methanolate, tetradecylammonium methanolate, tetradecyltrihexyl-ammonium methanolate, tetraoctadecylammonium methanolate, benzyltrimethylammonium methanolate, benzyltriethylammonium methanolate, trimethylphenylammonium methanolate, triethylmethylammonium methanolate, trimethylvinylammonium methanolate, methyltributyl-ammonium ethanolate, methyltriethylammonium ethanolate, tetramethylammonium ethanolate, tetraethylammonium ethanolate, tetrapropylammonium ethanolate, tetrabutyl-ammonium ethanolate, tetrapentylammonium ethanolate, tetrahexylammonium ethanolate, tetraoctylammonium methanolate, tetradecylammonium ethanolate, tetradecyltrihexyl-ammonium ethanolate, tetraoctadecylammonium ethanolate, benzyltrimethylammonium ethanolate, bertzyltriethylammonium ethanolate, trimethylphenylammonium ethanolate, triethylmethylammonium ethanolate, trimethylvinylammonium ethanolate, methyltributyl-ammonium benzylate, methyltriethylammonium benzylate, tetramethylammonium benzylate, tetraethylammonium benzylate, tetrapropylammonium benzylate, tetrabutylammonium benzylate, tetrapentylanamonium benzylate, tetrahexylanmionium benzylate, tetraoctyl-ammonium benzylate, tetradecylammonium benzylate, tetradecyltrihexylammonium benzylate, tetraoctadecylammonium benzylate, benzyltrimethylammonium benzylate, benzyhriethylammonium benzylate, trimethylpheitylammonium benzylate, triethylmethyl-ammonium benzylate, trimethylvinylarnmonium benzylate, tetramethylammonium fluoride, tetraethylammonium fluoride, tetrabutylammonium fluoride, tetraoctylammonium fluoride, benzyltrimethylammonium fluoride, tetrabutylphosphonium hydroxide, tetrabutyiphosphonium fluoride, tetrabutylammonium chloride, tetrabutylammonium bromide, tetrabutylammonium iodide, tetraethylammonium chloride, tetraethylammonium bromide, tetraethylammonium iodide, tetramethylammonium chloride, tetramethylammonium bromide, tetramethyl-ammonium iodide, benzyltrimethylammonium chloride, benzyltriethylarnmonium chloride, benzyltripropylammonium chloride, benzyltributylammonium chloride, methyltributyl-ammonium chloride, methyltripropylammonium chloride, methyltriethylammonium chloride, methyltriphenylammoniurn chloride, phenyltrimethylammonium chloride, benzyltrimethyl-ammonium bromide, benzyltriethylammonium bromide, benzyltripropylammonium bromide, benzyltributylammonium bromide, methyltributylammonium bromide, methyltripropyl-ammonium bromide, methyltriethylammonium bromide, methyltriphenylammonium bromide, phenyltrimethylammonium bromide, benzyltrimethylammonium iodide, benzyltriethyl-ammonium iodide, benzyltripropylammonium iodide, benzyltributylammonium iodide, methyltributylammonium iodide, methyltripropylammonium iodide, methyltriethylammonium iodide, methyhriphenylammonium iodide and phenyltrimethylammonium iodide, methyl-tributylammonium hydroxide, methyltriethylammonium hydroxide, tetramethylammonium hydroxide, tetraethylammonium hydroxide, tetrapropylammonium hydroxide, tetrabutyl-ammonium hydroxide, tetrapentylammonium hydroxide, tetrahexylammonium hydroxide, tetraoctylammonium hydroxide, tetradecylammonium hydroxide, tetradecyhrihexylammonium hydroxide, tetraoctadecylarrimonium hydroxide, benzyltrimethylammonium hydroxide, benzyltriethylammonium hydroxide, trimethylphenylammonium hydroxide, triethytmethyl-ammonium hydroxide, trimethylvinylammonium hydroxide, tetramethylammonium fluoride, tetraethylammonium fluoride, tetrabutylarrmionium fluoride, tetraoctylammonium fluoride and benzyltrimethylammonium fluoride.

11. The prepreg of claim 9, comprising the cocatalyst d1), wherein the cocatalyst d1) is at least one member selected from the group consisting of a glycidyl ether, a glycidyl ester, an aliphatic epoxide, and a diglycidyl ether based on bisphenol A and a glycidyl methacrylate.

12. The prepreg of claim 9, comprising the cocatalyst d2), wherein the cocatalyst d2) is a least one member selected from the group consisting of zinc acetylacetonate, lithium acetylacetonate and tin acetylacetonate.

13. The prepreg of claim 9, comprising the cocatalyst d2), wherein the cocatalyst d2) is at least one member selected from the group consisting of tetramethylammonium acetylacetonate, tetraethylammonium acetylacetonate, tetrapropylammonium acetylacetonate, tetrabutylammonium acetylacetonate, benzyltrimethylammonium acetylacetonate, benzyltriethylammonium acetylacetonate, tetramethylphosphonium acetylacetonate, tetraethylphosphonium acetylacetonate, tetrapropylphosphonium acetylacetonate, tetrabutylphosphonium acetylacetonate, benzyltrimethylphosphonium acetylacetonate, and benzyltriethylphosphonium acetylacetonate.

14. The prepreg of claim 1, wherein the resin component b) is liquid from 20 to 23° C.

15. The prepreg of claim 1, wherein the liquid resin component b) comprises at least one member selected from the group consisting of a monomeric-polyol, a polyester, a polycaprolactone, a polyether, a polyacrylate, a polycarbonate and a polyurethane, having an average molar mass of 62 to 3000 g/mol.

16. The prepreg of claim 1, wherein the liquid resin component b) comprises a polyol having a hydroxyl number number of 200 to 1500 mg KOH/gram.

17. The prepreg of claim 1, wherein the liquid resin component b) comprises a polyol having an average molecular weight of 100 to 1000 g/mol.

18. The prepreg of claim 1, wherein the liquid resin component b) comprises a polyol having a hydroxyl number number of 501 to 1000 mg KOH/gram, and which is liquid at 20 to 23° C.

19. The prepreg of claim 1, having a fiber volume content of more than 10%.

20. The prepreg of claim 1, consisting essentially of
   the fibrous support A) and the reactive polyurethane composition B)
   and the prepreg is attached to
   C) at least one foil fixed on the prepreg via the polyurethane composition.

21. A process for producing the prepreg of claim 1, the process comprising producing the reactive polyurethane composition,
   and
   impregnating the fibrous support with the polyurethane composition, which has optionally been dissolved in solvent,
   and optionally removing the solvent.

22. A direct melt impregnation process for producing the prepreg of claim 1, the process comprising producing the reactive polyurethane composition in a melt,
   and
   directly impregnating the fibrous support with the melt.

23. A composite component comprising, in reacted form, the prepreg of claim 1.

24. A composite component comprising, in reacted form, the prepreg of claim 1, wherein the polyurethane composition is crosslinked.

25. The prepreg of claim 1, which is storage-stable and does not undergo polymerization in storage for 28 days at 40° C.

\* \* \* \* \*